United States Patent
Yuyama et al.

(10) Patent No.: US 10,763,548 B2
(45) Date of Patent: *Sep. 1, 2020

(54) ELECTROLYTE SOLUTION FOR SECONDARY BATTERIES, AND SECONDARY BATTERY

(71) Applicant: NISSHINBO HOLDINGS, INC., Tokyo (JP)

(72) Inventors: Kanako Yuyama, Chiba (JP); Gen Masuda, Chiba (JP)

(73) Assignee: NISSHINBO HOLDINGS, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/534,073

(22) PCT Filed: Oct. 29, 2015

(86) PCT No.: PCT/JP2015/080489
§ 371 (c)(1),
(2) Date: Jun. 8, 2017

(87) PCT Pub. No.: WO2016/103905
PCT Pub. Date: Jun. 30, 2016

(65) Prior Publication Data
US 2017/0338516 A1    Nov. 23, 2017

(30) Foreign Application Priority Data

Dec. 22, 2014  (JP) .................... 2014-258863

(51) Int. Cl.
*H01M 10/0569* (2010.01)
*H01M 10/0525* (2010.01)
(Continued)

(52) U.S. Cl.
CPC ........ *H01M 10/0569* (2013.01); *H01G 11/06* (2013.01); *H01G 11/60* (2013.01);
(Continued)

(58) Field of Classification Search
CPC ........... H01M 10/0569; H01M 10/052; H01M 10/0525; H01M 4/485; H01M 10/0568;
(Continued)

(56) References Cited

U.S. PATENT DOCUMENTS 7,471,502 B2   12/2008  Sato et al.
2004/0045597 A1*  3/2004  Kimijima .............. H01M 2/021
                                                              136/251
(Continued)

FOREIGN PATENT DOCUMENTS

CN   101747243 A   6/2010
EP   1642894 A1    4/2006
(Continued)

OTHER PUBLICATIONS

Soavi et al. J. Appl. Electrochem. (2014) 44:491-496 (Year: 2014).*
(Continued)

*Primary Examiner* — Lisa S Park
(74) *Attorney, Agent, or Firm* — Westerman, Hattori, Daniels & Adrian, LLP

(57) ABSTRACT

A secondary battery having good performance especially in a high-temperature environment can be obtained by using an electrolyte solution for secondary batteries, which is characterized by containing an ionic liquid represented by formula (1) and a lithium salt.
(Continued)

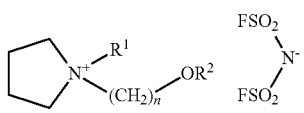

Figure 1:
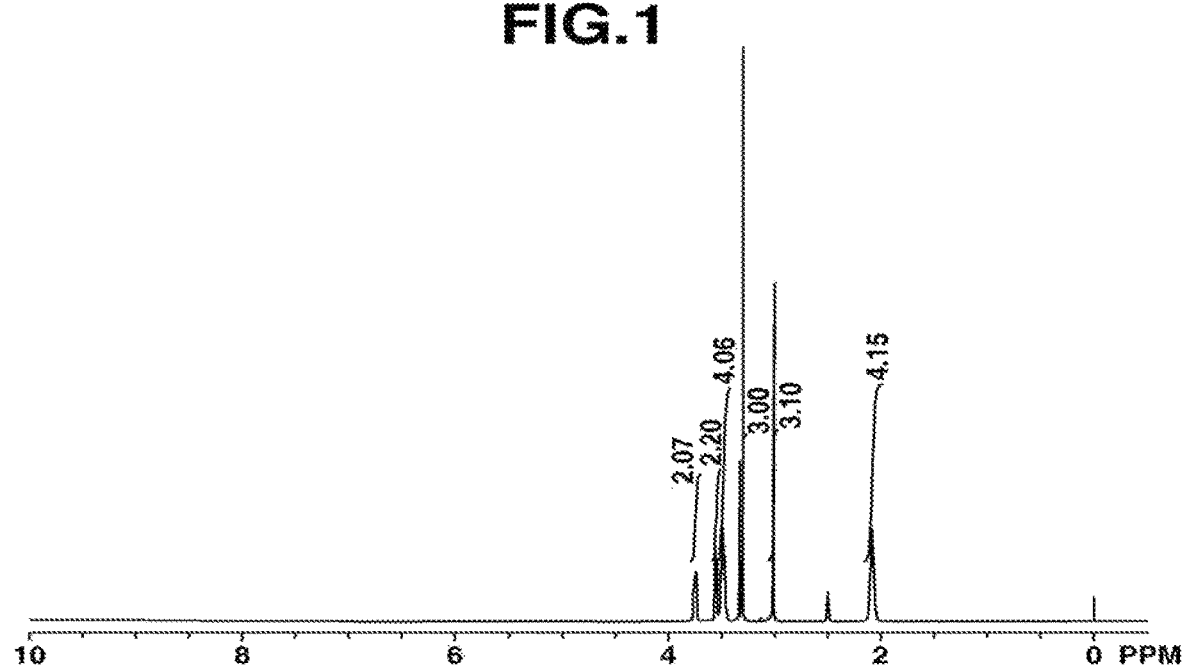

(In the formula, each of $R^1$ and $R^2$ independently represents an alkyl group having 1-5 carbon atoms; and n represents 1 or 2.)

7 Claims, 2 Drawing Sheets

(51) Int. Cl.
| | | |
|---|---|---|
| H01M 10/0568 | (2010.01) | |
| H01M 4/485 | (2010.01) | |
| H01M 4/02 | (2006.01) | |
| H01G 11/06 | (2013.01) | |
| H01G 11/62 | (2013.01) | |
| H01G 11/28 | (2013.01) | |
| H01G 11/60 | (2013.01) | |
| H01M 10/052 | (2010.01) | |
| H01G 11/64 | (2013.01) | |

(52) U.S. Cl.
CPC ............. *H01G 11/62* (2013.01); *H01G 11/64* (2013.01); *H01M 4/485* (2013.01); *H01M 10/052* (2013.01); *H01M 10/0525* (2013.01); *H01M 10/0568* (2013.01); *H01G 11/28* (2013.01); *H01M 2004/027* (2013.01); *H01M 2300/0045* (2013.01); *Y02E 60/13* (2013.01)

(58) Field of Classification Search
CPC .... H01M 2300/0045; H01M 2004/027; H01G 11/64; H01G 11/06; H01G 11/60; H01G 11/62; H01G 11/28
See application file for complete search history.

(56) References Cited

U.S. PATENT DOCUMENTS

| | | |
|---|---|---|
| 2007/0042271 A1 | 2/2007 | Nishida et al. |
| 2008/0050657 A1 | 2/2008 | Nishida et al. |
| 2011/0311865 A1* | 12/2011 | Tatsumi .............. H01M 10/052 429/199 |
| 2012/0308882 A1* | 12/2012 | Ito ....................... C07D 207/06 429/200 |
| 2014/0295262 A1 | 10/2014 | Nakamoto et al. |
| 2014/0342249 A1* | 11/2014 | He ...................... H01M 10/056 429/403 |
| 2014/0377621 A1 | 12/2014 | Hanyu et al. |
| 2015/0132649 A1 | 5/2015 | Ogino et al. |
| 2015/0132665 A1* | 5/2015 | Ito ....................... C07D 207/06 429/336 |
| 2015/0179355 A1* | 6/2015 | Yeon ..................... H01G 11/28 320/128 |
| 2016/0111228 A1 | 4/2016 | Okuno et al. |

FOREIGN PATENT DOCUMENTS

| | | |
|---|---|---|
| EP | 1837333 A1 | 9/2007 |
| EP | 2023434 A1 | 2/2009 |
| EP | 2549577 A1 | 1/2013 |
| EP | 2978002 A1 | 1/2016 |
| JP | 2006-236829 A | 9/2006 |
| JP | 4617727 B2 | 1/2011 |
| JP | 2011-134459 A | 7/2011 |
| JP | 2011 253677 A | 12/2011 |
| JP | 5083577 B2 | 11/2012 |
| JP | WO2013/051308 A1 | 4/2013 |
| JP | 2013-89365 A | 5/2013 |
| JP | 2014-183161 A | 9/2014 |
| JP | 2014-197472 A | 10/2014 |
| JP | 2014-238935 A | 12/2014 |
| JP | 2014-239006 A | 12/2014 |
| JP | 2015-118924 A | 6/2015 |
| WO | 2005/003108 A1 | 1/2005 |
| WO | 2014/148250 A1 | 9/2014 |

OTHER PUBLICATIONS

Quartarone et al. J. Power Sources 195 (2010) 559-566 (Year: 2010).*
Appetecchi et al. Electrochinnica Acta 56 (2011) 1300-1307 (Year: 2011).*
International Search Report, dated Jan. 12, 2016, issued in International Appl. No. PCT/JP2015/080496, which is counterpart to co-pending U.S. Appl. No. 15/535,193 (in English; 1 page).
Extended (Supplementary) European Search Report, dated Jun. 5, 2018, issued in European application No. 15872475.7, which is counterpart to co-pending U.S. Appl. No. 15/535,193 (in English; 7 pages).
Non-Final Office Action, dated Aug. 15, 2018, issued in co-pending U.S. Appl. No. 15/535,193 (14 pages; w/returned PTO/SB/08a form and PTO-892).
International Search Report dated Feb. 2, 2016, counterpart to International Application No. PCT/JP2015/080489. (2 pages).
Matsumoto, Hajime et al., First cycling of Li/LiCoO2 cell with low-viscosity ionic liquids based on bis (fluorosulfonyl imide [FSI], Journal of Power Sources, No. 160, 2006, pp. 1308-1313.
Search Report dated Jun. 5, 2018, issued in counterpart European Application No. 15872474.0 (13 pages).
Office Action, dated Jan. 24, 2019, issued in co-pending U.S. Appl. No. 15/535,193 (20 pages, w/ returned PTO/SB/08a forms).
Advisory Action, dated Apr. 29, 2019, issued in co-pending U.S. Appl. No. 15/535,193 (8 pages, w/ PTOL-413B form, PTOL-2323 form, and PTO-892 form).

* cited by examiner

ELECTROLYTE SOLUTION FOR SECONDARY BATTERIES, AND SECONDARY BATTERY

TECHNICAL FIELD

This invention relates to a liquid electrolyte for secondary batteries and to a secondary battery. The invention relates more particularly to a liquid electrolyte for secondary batteries which includes a specific ionic liquid and a lithium salt, and to a secondary battery that uses the same.

BACKGROUND ART

In recent years, the spread of portable electronic devices such as digital cameras, smart phones and tablet devices has been remarkable. This has been accompanied by a large growth in demand for secondary batteries that can be charged and repeatedly used, as well as an increasing desire for higher capacity and higher energy density in such batteries.

Of these, lithium-based secondary batteries with a high cell voltage of 3V or more and a large energy density per unit weight have attracted particular attention and are today the subject of vigorous development efforts.

An electrolyte solution obtained by dissolving an ion-conductive salt such as $LiBF_4$ or $LiPF_6$ in an aprotic organic solvent is generally used in these lithium-based secondary batteries.

Most lithium-based secondary batteries are designed so as to charge and discharge within the voltage range between a fully charged cell voltage of 4.2 V and an end-of discharge voltage of about 2.7 V. However, in high-voltage secondary batteries having a voltage of 4 V or more, the organic solvent and electrode active materials used are sometimes exposed to high voltages and electrically decompose.

Various improvements in the materials making up lithium-based secondary batteries have been attempted to date in order to solve such problems. One such technology involves the use of an ionic liquid as a component of a liquid electrolyte.

For example, Patent Document 1 discloses a secondary power supply which uses an electrolyte that includes a lithium salt, an ionic liquid and an organic solvent. More specifically, this publication discloses a secondary power supply in which 1-ethyl-3-methylimidazolium tetrafluoroborate (abbreviated below as EMIBF4) is used as the ionic liquid and the molar ratio thereof with respect to lithium salt is set in a specific range. However, a drawback of EMIBF4 is that, although it has a relatively low viscosity, because the withstand voltage is low, the charging voltage cannot be raised, making use in a high voltage region impossible.

Patent Document 2 discloses a liquid electrolyte which includes both an ionic liquid containing an alicyclic ammonium cation having a specific alkoxyalkyl group on a nitrogen atom, and an ion-conductive salt that is a solid at room temperature. Specifically, a liquid electrolyte containing N-methoxyethyl-N-methylpyrrolidinium tetrafluoroborate (MEMPBF4) and the like as the ionic liquid, and an electrical double-layer capacitor that uses the same are disclosed. However, MEMPBF4 does not have a sufficient ability to dissolve lithium salts, and so increasing the lithium salt concentration is difficult. In addition, because it has a high viscosity, when the ionic liquid alone is used as a liquid electrolyte, the internal resistance of the battery rises.

Patent Document 3 discloses a lithium-ion capacitor which uses a liquid electrolyte that includes both a lithium salt and an ionic liquid, wherein the lithium salt and the ionic liquid have the same anion. Specifically, a capacitor is disclosed in which a compound such as N-methyl-N-butylpyrrolidinium bis(fluorosulfonyl)amide (MBPYFSA) is used as the ionic liquid and lithium bis(fluorosulfonyl)amide is used as the lithium salt. However, in the case of a compound such as MBPYFSA, because the ionic liquid itself has a higher viscosity than EMIBF4, adding a lithium salt further increases the viscosity, lowering the charge-discharge characteristics when such an electrolyte is included in a lithium-ion battery.

Patent Document 4 discloses various bis(fluorosulfonyl)amide anion-containing ionic liquids and methods for their synthesis, and also discloses that these ionic liquids can be used as electrolyte materials in secondary batteries and the like. Although N-methoxyethyl-N-methylpyrrolidinium bis(fluorosulfonyl)amide (MEMP.FSA) is disclosed here as a specific ionic liquid, no mention is made of the characteristics of secondary batteries in which this is used.

Because there are cases in which, depending on the service environment and conditions, electrical energy storage devices such as secondary batteries are exposed to elevated temperatures, stability under such elevated temperatures is also demanded. However, none of the foregoing literature makes any mention of findings relating to the performance of secondary batteries in high-temperature environments.

PRIOR ART DOCUMENTS

Patent Documents

Patent Document 1: JP No. 4617727

Patent Document 2: JP No. 5083577

Patent Document 3: JP-A 2014-183161

Patent Document 4: CN-A 101747243

SUMMARY OF THE INVENTION

Problems to be Solved by the Invention

In light of the above circumstances, the object of this invention is to provide a liquid electrolyte for secondary batteries that includes an ionic liquid and a lithium salt, and that affords secondary batteries having a good performance particularly in high-temperature environments.

Means for Solving the Problems

As a result of extensive investigations, the inventors have discovered that ionic liquids consisting of a specific pyrrolidinium cation and the bis(fluorosulfonyl)amide anion have an excellent ability to dissolve lithium salts, and that the outstanding properties of such ionic liquids are not lost even when they are mixed with a lithium salt. The inventors have also found that secondary batteries obtained using a liquid electrolyte containing this ionic liquid and a lithium salt exhibit a good battery performance even in a high-temperature environment.

Accordingly, this invention provides:
1. A liquid electrolyte for a secondary battery, characterized by comprising an ionic liquid of formula (1) and a lithium salt

[Chemical Formula 1]

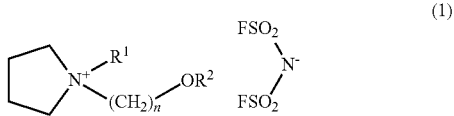
(1)

(wherein $R^1$ and $R^2$ are each independently an alkyl group of 1 to 5 carbon atoms, and n is 1 or 2);
2. The liquid electrolyte for a secondary battery of 1 above, wherein $R^1$ and $R^2$ are each independently a methyl group or an ethyl group;
3. The liquid electrolyte for a secondary battery of 1 or 2 above, wherein $R^1$ and $R^2$ are both methyl groups;
4. The liquid electrolyte for a secondary battery of any of 1 to 3 above which is free of organic solvent;
5. The liquid electrolyte for a secondary battery of any of 1 to 4 above which consists solely of the ionic liquid of formula (1) and a lithium salt;
6. The liquid electrolyte for a secondary battery of any of 1 to 5 above, wherein the lithium salt is one or more selected from the group consisting of lithium tetrafluoroborate, lithium hexafluorophosphate, lithium bis(trifluoromethanesulfonyl)amide and lithium bis(fluorosulfonyl)amide;
7. A secondary battery characterized by comprising the liquid electrolyte for a secondary battery of any of 1 to 6 above; and
8. A secondary battery comprising a positive electrode having a positive electrode current collector and a positive electrode active material layer formed on a surface thereof, a negative electrode having a negative electrode current collector and a negative electrode active material layer formed on a surface thereof, a separator interposed between the electrodes, and a liquid electrolyte,
wherein the liquid electrolyte is the liquid electrolyte for a secondary battery of any of 1 to 6 above and the negative electrode active material layer includes a lithium composite oxide.

Advantageous Effects of the Invention

An advantage of this invention is that it provides an ionic liquid-containing liquid electrolyte in which a lithium salt can be dissolved without losing the excellent properties of the ionic liquid, and which affords a secondary battery having an excellent performance in a high-temperature environment.

The ionic liquid used in this liquid electrolyte has a high withstand voltage, and thus undergoes little deterioration even in secondary batteries where the potential of the liquid electrolyte reaches a high-voltage region. Moreover, secondary batteries obtained using this liquid electrolyte have a lower internal resistance at elevated temperatures and undergo little deterioration even when charging and discharging are repeatedly carried out in a high-temperature environment.

In addition, the ionic liquid used in the liquid electrolyte of the invention has an excellent ability to dissolve lithium salts and also has a relatively low viscosity. As a result, an organic solvent is either not used or, when used, the amount thereof can be made very small, enabling a secondary battery having an excellent safety to be provided.

BRIEF DESCRIPTION OF THE DIAGRAMS

Figure 2:
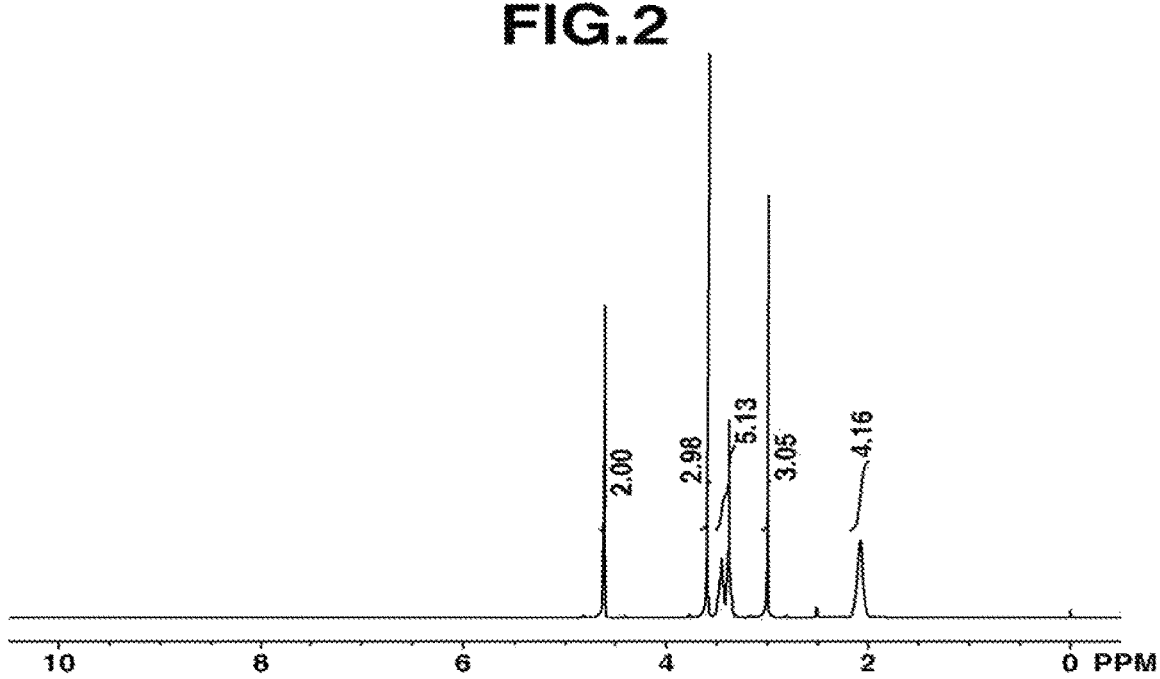
Figure 3:
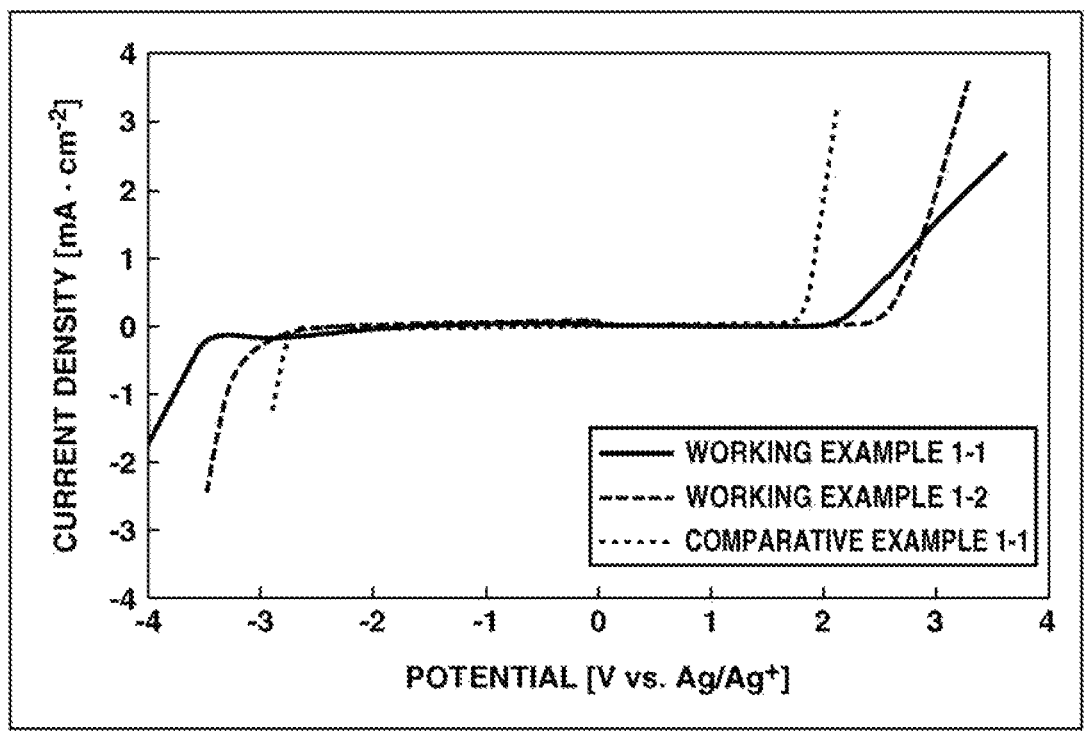

FIG. 1 is a $^1$H-NMR spectrum of the MEMP.FSA obtained in Synthesis Example 1.
FIG. 2 is a $^1$H-NMR spectrum of the MMMP.FSA obtained in Synthesis Example 2.
FIG. 3 is a graph showing the results of potential window measurements on the liquid electrolytes prepared in Working Examples 1-1 and 1-2 and in Comparative Example 1-1.

EMBODIMENT FOR CARRYING OUT THE INVENTION

The invention is described more fully below.
The liquid electrolyte for a secondary battery according to the invention includes an ionic liquid of formula (1) and a lithium salt.

[Chemical Formula 2]

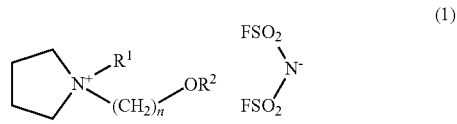
(1)

In the formula, $R^1$ and $R^2$ are each independently an alkyl group of 1 to 5 carbon atoms, and n is 1 or 2.
The alkyl group of 1 to 5 carbon atoms may be linear, branched or cyclic. Illustrative examples include methyl, ethyl, n-propyl, i-propyl, c-propyl, n-butyl, i-butyl, s-butyl, t-butyl, c-butyl, n-pentyl and c-pentyl groups. A linear alkyl group is preferred, with methyl and ethyl groups being more preferred, and a methyl group being even more preferred.

The ionic liquid used in the invention can be prepared by, for example, the method described in Patent Document 4. For instance, the ionic liquid can be obtained by carrying out an anion exchange reaction between an N-alkoxyalkyl-N-alkylpyrrolidinium halide (e.g., chloride, bromide) prepared in the usual manner and a bis(fluorosulfonyl)amide salt of an alkali metal (e.g., sodium, potassium) within an aqueous solvent.

Examples of cation structures in the ionic liquid that can be suitably used in this invention include, but are not limited to, those shown below.

[Chemical Formula 3]

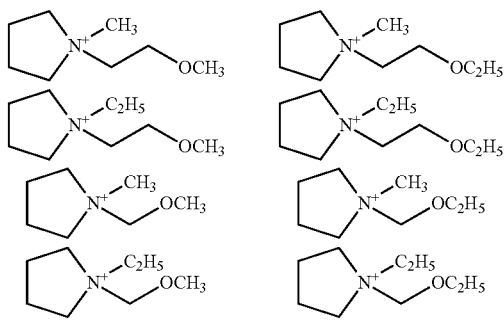

Of these, in terms of having a better thermal stability, cation structure (A) below is preferred; in terms of having a lower viscosity, cation structure (B) below is preferred.

[Chemical Formula 4]

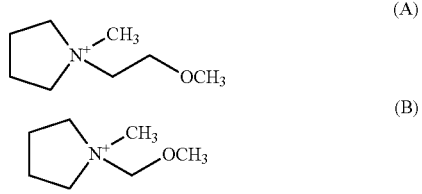

The lithium salt which is the other ingredient making up the inventive liquid electrolyte for secondary batteries is exemplified by various lithium salts that have hitherto been widely used in lithium secondary batteries and other secondary batteries. Illustrative examples include lithium tetrafluoroborate, lithium hexafluorophosphate, lithium bis(trifluoromethanesulfonyl)amide, lithium bis(fluorosulfonyl)amide, lithium perchlorate, lithium acetate, lithium trifluoroacetate, lithium benzoate, lithium p-toluenesulfonate, lithium nitrate, lithium bromide and lithium iodide. Of these, lithium tetrafluoroborate, lithium hexafluorophosphate, lithium bis(trifluoromethanesulfonyl)amide and lithium bis(fluorosulfonyl)amide are preferred.

The lithium salt concentration in the liquid electrolyte for a secondary battery, although not particularly limited, is generally from about 0.5 to about 3 mol/L, preferably from about 0.8 to about 2 mol/L, and more preferably from about 0.9 to about 1.5 mol/L.

A nonaqueous organic solvent commonly used for preparing electrolyte solutions may also be used in the liquid electrolyte for secondary batteries of the invention. Because the ionic liquid used in this invention has a relatively low viscosity itself and also has a good ability to dissolve lithium salts, even in cases where a nonaqueous solvent is used, the amount of use thereof is preferably not more than 10 wt %, more preferably not more than 5 wt %, and optimally 0 wt % (meaning that the liquid component consists only of the ionic liquid) of the liquid electrolyte.

In cases where a nonaqueous organic solvent is used together in the liquid electrolyte of the invention, illustrative examples of this solvent include acyclic ethers such as dibutyl ether, 1,2-dimethoxyethane, 1,2-ethoxymethoxyethane, methyl diglyme, methyl triglyme, methyl tetraglyme, ethyl glyme, ethyl diglyme, butyl diglyme, ethyl cellosolve, ethyl carbitol, butyl cellosolve and butyl carbitol; heterocyclic ethers such as tetrahydrofuran, 2-methyltetrahydrofuran, 1,3-dioxolane and 4,4-dimethyl-1,3-dioxane; lactones such as γ-butyrolactone, γ-valerolactone, δ-valerolactone, 3-methyl-1,3-oxazolidin-2-one and 3-ethyl-1,3-oxazolidin-2-one; amides such as N-methylformamide, N,N-dimethylformamide, N-methylacetamide and N-methylpyrrolidinone; carbonates such as diethyl carbonate, dimethyl carbonate, ethyl methyl carbonate, propylene carbonate, ethylene carbonate and butylene carbonate; imidazolines such as 1,3-dimethyl-2-imidazolidinone; and nitriles such as acetonitrile and propionitrile. These may be used singly, or two or more may be used in admixture.

The secondary battery according to the invention is not particularly limited, provided it includes the above-described liquid electrolyte for secondary batteries. For example, the inventive liquid electrolyte for secondary batteries may be employed in an ordinary secondary battery having a positive electrode made of a positive electrode current collector and a positive electrode active material layer formed on the surface thereof, a negative electrode made of a negative electrode current collector and a negative electrode active material layer formed on the surface thereof, and a separator interposed between these electrodes; or may be employed in an air battery having a positive electrode (air electrode) layer, a negative electrode layer, and a liquid electrolyte layer disposed between the electrodes.

The materials making up this secondary battery are not particularly limited, and may be suitably selected and used from among conventional known materials. Some examples are given below.

Illustrative examples of positive electrode current collectors include aluminum foil and aluminum alloy foil. Three dimensional porous bodies thereof, such as foams or nonwoven fabric-like bodies, may be used as the current collector.

Specific examples of positive electrode active materials include carbonaceous materials such as activated carbon and carbon nanotube that are able to reversibly support lithium; and lithium oxides having an olivine-type crystal structure, a layered rock salt-type crystal structure or a spinel-type crystal structure. Illustrative examples of activated carbon starting materials include coconut shell, phenolic resin and petroleum coke. Methods for activating the activated carbon starting material include steam activation and molten alkali activation. Illustrative examples of lithium oxides include composite oxides of the general formula $LiMPO_4$ (where M is one or more from among Fe(II), Mn(II), Co(II) and Ni(II)), lithium cobalt oxide ($LiCoO_2$), $LiNiO_2$, $LiMnO_2$, $Li_2MnO_3$, and NiCo systems such as $LiNi_{0.8}Co_{0.2}O_2$.

Illustrative examples of negative electrode current collectors include copper foil, copper alloy foil, nickel foil, nickel alloy foil, stainless steel foil, aluminum foil and aluminum alloy foil.

Illustrative examples of negative electrode active materials include, without particular limited, substances capable of intercalating and deintercalating lithium ions, such as carbonaceous materials (graphite, etc.), silicon oxides, silicon alloys, tin oxides, tin alloys, lithium, and metals that can form lithium alloys, such as aluminum, lead, tin, indium, bismuth, silver, barium, calcium, mercury, palladium, platinum, tellurium, zinc and lanthanum. These may be of one type used alone, or two or more types may be used in combination. A carbonaceous material or lithium composite oxide is preferred from the standpoint of safety. In addition, a substance containing titanium (Ti), lithium (Li) or both Ti and Li (e.g., lithium titanate) is preferred from the standpoint of the charge-discharge characteristics at a high current density.

The positive electrode active material and the negative electrode active material may be used together with a conductive additive.

Illustrative examples of conductive additives include carbon black, ketjen black, acetylene black, carbon whiskers, carbon fibers, natural graphite, synthetic graphite, titanium oxide, ruthenium oxide, aluminum and nickel.

The positive electrode and negative electrode active material layers can be formed by coating the current collector with an electrode slurry containing the above described active material, a binder polymer and, optionally, a conductive additive with a solvent, and then drying under applied heat, where necessary.

Binder polymers that are suitably selected from among known materials may be used. Illustrative examples include polyvinylidene fluoride (PVdF), polyvinyl pyrrolidone, polytetrafluoroethylene, tetrafluoroethylene-hexafluoropropylene copolymers, vinylidene fluoride-hexafluoropropylene copolymers ([P(VDF-HFP)], vinylidene fluoride-chlorotrifluoroethylene copolymers [P(VDF-CTFE)], polyvinyl alcohol, ethylene-propylene-diene terpolymers, styrene-butadiene rubbers and carboxymethylcellulose (CMC).

The solvent is selected according to the type of binder polymer, with N-methyl-2-pyrrolidone or water generally being used.

If necessary, the electrodes having an active material layer formed therein may be pressed.

Illustrative examples of the separator include separators made of a polyolefin such as polyethylene or polypropylene, separators made of a polyester such as polyethylene terephthalate, polyamide separators, polyimide separators, cellulose-based separators and glass-fiber-based separators.

The secondary battery of the invention can be obtained by stacking, fan-folding or winding and, if necessary, forming into a coin shape, a battery assembly composed of the positive electrode, the negative electrode and a separator interposed therebetween. The assembly is then placed within a battery housing such as a battery can or a laminate pack, after which it is filled with the inventive liquid electrolyte for secondary batteries. The housing is then mechanically sealed if it is a can or heat-sealed if it is a laminate pack.

EXAMPLES

The invention is illustrated more fully below by way of Synthesis Examples, Working Examples and Comparative Examples, although these Examples are not intended to limit the invention.

The analytical instruments used in the Examples were as follows.

[1] $^1$H-NMR Spectrometer
  Instrument: AL-400, from JEOL Ltd.
  Solvent: Deuterated dimethylsulfoxide
[2] Viscometer
  Instrument: BROOKFIELD programmable rheometer
[3] Electrical Conductivity
  Instrument: CM-30R conductivity meter, from DKK-Toa Corporation
[4] Potential Window
  Instrument: HSV-100 Standard Voltammetry Tool, from Hokuto Denko Corporation
[5] Internal Resistance
  Instrument: RM 3548 resistance meter, from Hioki EE Corporation
[1] Synthesis of Ionic Liquids

[Synthesis Example 1] Synthesis of MEMP.FSA

[Chemical Formula 5]

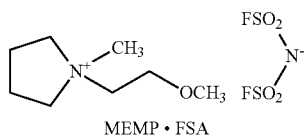

MEMP · FSA

Pyrrolidine (Wako Pure Chemical Industries, Ltd.), 1.51 parts by weight, and 2-methoxyethyl chloride (Kanto Chemical Co., Ltd.), 1.00 part by weight, were mixed together and reacted for 1 hour under refluxing. Following the reaction, the reaction mixture separated into two layers. When left to cool for a while, the bottom layer solidified. The top layer alone was collected by decantation and purified by vacuum distillation, giving 0.96 part by weight of the target substance N-2-methoxyethylpyrrolidine (boiling point, 76° C.; vapor pressure, 45 mmHg) in a yield of 70%.

Next, 1.00 part by weight of the N-2-methoxyethylpyrrolidine was mixed with a two-fold volume of toluene (Wako Pure Chemical Industries, Ltd.), the mixture was placed in an autoclave, and the interior of the system was nitrogen purged. The system was closed, after which about 1.00 part by weight of methyl chloride gas (Nittoku Chemicals) was added under stirring at room temperature. During introduction of the methyl chloride gas, the temperature and internal pressure both rose; at the highest point, the temperature rose to about 53° C. and the internal pressure rose to 5.5 kgf/cm$^2$ (about 5.4×10$^5$ Pa). The reaction was effected in this way without heating; after 2 days, about 0.75 part by weight of methyl chloride gas was added. The reaction was additionally continued for one day, after which the pressure was released. The crystals that formed within the system were separated off by vacuum filtration and then dried using a vacuum pump, thereby giving 1.29 parts by weight of N-2-methoxyethyl-N-methylpyrrolidinium chloride (yield, 92%).

An equal volume of deionized water was added to 1.00 part by weight of the resulting N-2-methoxyethyl-N-methylpyrrolidinium chloride, and the chloride was dissolved under stirring. This solution was added under stirring to a solution of 1.29 parts by weight of potassium bis(fluorosulfonyl)amide (Kanto Chemical Co., Ltd.) dissolved in an equal volume of deionized water. The reaction was effected at room temperature and, after 3 or more hours had elapsed, the reaction mixture that had separated into two layers was collected as separate layers. The organic layer on the bottom was washed twice with deionized water and then dried using a vacuum pump, giving 1.50 parts by weight of the target substance N-2-methoxyethyl-N-methylpyrrolidinium bis(fluorosulfonyl)amide (MEMP.FSA) (yield, 83%). The $^1$H-NMR spectrum for MEMP.FSA is shown in FIG. 1. The viscosity at 25° C. was 35 cP.

[Synthesis Example 2] Synthesis of MMMP.FSA

[Chemical Formula 6]

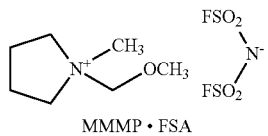

MMMP · FSA

A solution of 14.4 parts by weight of N-methylpyrrolidine (Wako Pure Chemical Industries, Ltd.) dissolved in 200 parts by weight of tetrahydrofuran (Wako Pure Chemical Industries, Ltd.) was ice-cooled, and 17.1 parts of chloromethyl methyl ether (Tokyo Chemical Industry Co., Ltd.) was added under stirring. After allowing these to react overnight, the precipitated solids were collected by filtration in vacuo using a Kiriyama funnel. The resulting white solid was dried using a vacuum pump, giving 26.7 parts by weight of the intermediate N-methoxymethyl-N-methylpyrrolidinium chloride (yield, 96%).

Next, 8.58 parts by weight of the N-methoxymethyl-N-methylpyrrolidinium chloride was dissolved in 10 parts by weight of deionized water. This solution was added under stirring to a solution of 12.5 parts by weight of potassium bis(fluorosulfonyl)amide (Kanto Chemical Co., Ltd.) dissolved in 5 parts by weight of deionized water. Stirring was continued overnight at room temperature, following which the reaction mixture that had separated into two layers was collected as separate layers. The organic layer on the bottom was washed four times with deionized water and then dried using a vacuum pump, giving 10.2 parts by weight of the target substance N-methoxymethyl-N-methylpyrrolidinium bis(fluorosulfonyl)amide (MMMP.FSA) (yield, 63%). The $^1$H-NMR spectrum for MMMP.FSA is shown in FIG. 2. The viscosity at 25° C. was 20 cP.

[2] Preparation of Liquid Electrolyte for Secondary Batteries

Working Example 1-1

Lithium bis(fluorosulfonyl)amide (Li.FSA, from Kanto Chemical Co., Ltd.) was added to the MEMP.FSA obtained in Synthesis Example 1, thereby preparing a liquid electrolyte for secondary batteries having a Li.FSA concentration of 1 mol/L.

Working Example 1-2

Aside from using the MMMP.FSA obtained in Synthesis Example 2, a liquid electrolyte for secondary batteries was prepared in the same way as in Working Example 1-1.

Comparative Example 1-1

Aside from using 1-ethyl-3-methylimidazolinium tetrafluoroborate (EMI.BF4, from Kanto Chemical Co., Ltd.) instead of MEMP.FSA, a liquid electrolyte for secondary batteries was prepared in the same way as in Working Example 1-1.

Comparative Example 1-2

Aside from using 2-methoxyethyl-N-methylpyrrodinium tetrafluoroborate (MEMP.BF4) synthesized by the method described in Patent Document 2 instead of MEMP.FSA, an attempt was made to prepare a liquid electrolyte for secondary batteries in the same way as in Working Example 1-1. However, dissolution of the Li.FSA to a concentration 1 mol/L was not possible, resulting in a cloudy liquid.

Comparative Example 1-3

Aside from using propylene carbonate (Kishida Chemical Co., Ltd.) instead of MEMP.FSA and using lithium tetrafluoroborate (Li.BF$_4$, from Kishida Chemical Co., Ltd.) instead of Li.FSA, a liquid electrolyte for secondary batteries was prepared in the same way as in Working Example 1-1.

The electrical conductivities of each of the liquid electrolytes prepared above (in Comparative Example 1-2, the cloudy liquid) were measured. Measurement was carried out in a 25° C. thermostatic chamber using a conductivity meter (CM-30R, from DKK-Toa Corporation). The results are shown in Table 1.

TABLE 1

| | Electrical conductivity (mS/cm) |
|---|---|
| Working Example 1-1 | 1.9 |
| Working Example 1-2 | 2.9 |
| Comparative Example 1-1 | 4.5 |
| Comparative Example 1-2 | 1.5 |
| Comparative Example 1-3 | 3.2 |

In addition, the potential windows for each of the liquid electrolytes obtained in Working Example 1-1, Working Example 1-2 and Comparative Example 1-1 were measured. Those results are shown in FIG. 3.

As demonstrated in FIG. 3, the potential windows of the liquid electrolytes in Working Examples 1-1 and 1-2 were confirmed to be broader than the potential window of the liquid electrolyte in Comparative Example 1-1.

[3] Production of Secondary Battery

[Working Example 2-1] Lithium-Ion Capacitor (1) Production of Positive Electrode Assembly A coating slurry for a positive electrode was prepared by mixing together the activated carbon Maxsorb MSP-20 (Kansai Coke and Chemicals Co., Ltd.), a conductive material (HS-100, from Denka Co., Ltd.) and the binder PVDF (Aldrich Co.) in the weight ratio 85:8:7 within the coating solvent N-methyl-2-pyrrolidone (NMP).

The slurry was coated onto etched aluminum foil (30B, from Japan Capacitor Industrial Co., Ltd.) as the positive current collector and then rolled using a roll press, following which the NMP was removed by drying so as to form a positive electrode, thereby giving a positive electrode assembly.

(2) Production of Negative Electrode Assembly

A coating slurry for a negative electrode was prepared by mixing together lithium titanate powder (lithium titanium, spinel; from Sigma-Aldrich Co.), a conductive material (HS-100), and a binder (PVDF) in the weight ratio 83:8:9 within NMP as the coating solvent.

The slurry was coated onto etched aluminum foil (30CB) in the same way as for the positive electrode assembly and then rolled using a roll press, following which the NMP was removed by drying so as to form a negative electrode, thereby giving a negative electrode assembly.

(3) Production of Secondary Battery

A cell was assembled by spot-welding aluminum terminals to each of the positive electrode assembly and the negative electrode assembly obtained as described above and placing a separator (TF40-35, from Nippon Kodoshi Corporation) therebetween, and the cell was inserted into an outer enclosure made of an aluminum laminate (Dai Nippon Printing Co., Ltd.). A predetermined amount of the liquid electrolyte for secondary batteries prepared in Working Example 1-1 was injected therein, following which electrolyte impregnation was effected by at least 12 hours of standing at 25° C. under a reduced pressure of 10 kPa or below. The enclosure was then sealed by heat welding, giving a secondary battery.

Working Example 2-2

Aside from using the liquid electrolyte for secondary batteries prepared in Working Example 1-2, a secondary battery was produced in the same way as in Working Example 2-1.

Comparative Example 2-1

Aside from using the liquid electrolyte for secondary batteries prepared in Comparative Example 1-1, a secondary battery was produced in the same way as in Working Example 2-1.

Comparative Example 2-2

Aside from using the liquid electrolyte for secondary batteries (cloudy liquid) prepared in Comparative Example 1-2, a secondary battery was produced in the same way as in Working Example 2-1.

Comparative Example 2-3

Aside from using the liquid electrolyte for secondary batteries prepared in Comparative Example 1-3, a secondary battery was produced in the same way as in Working Example 2-1.

The initial characteristics of the secondary batteries produced as described above were measured by the following methods. The results are shown in Table 2.

First, the capacitance was calculated from the total amount of energy discharged when, after being constant-current charged to 3.2 V at the one-hour rate and constant-voltage charged thereafter for 30 minutes, the battery was subsequently constant-current discharged from 3.2 V to 1.8 V at the one-hour rate. Measurement was carried out over two cycles, with the second-cycle value being treated as the capacitance. The internal resistance was measured with a resistance meter (RM 3548, from Hioki EE Corporation) following the charge/discharge test. Each of the measurements was carried out following at least two hours of standing in a thermostatic chamber at 25° C.

TABLE 2

|  | Initial characteristics | |
|---|---|---|
|  | Capacitance (F) | Internal resistance (Ω) |
| Working Example 2-1 | 2.5 | 6.4 |
| Working Example 2-2 | 3.5 | 5.5 |
| Comparative Example 2-1 | 2.3 | 3.8 |
| Comparative Example 2-2 | 1.7 | 10.4 |
| Comparative Example 2-3 | 2.5 | 3.2 |

Next, the secondary batteries obtained were left to stand for at least 2 hours in a thermostatic chamber at 60° C., and the capacitance and internal resistance were measured in the same way as for measurement of the initial performance. The results are shown in Table 3.

As shown in Table 3, owing to the rise in temperature, increases in capacitance were observed in each secondary battery. Also, the secondary batteries obtained in Working Examples 2-1 and 2-2 underwent a large decrease in internal resistance at 60° C., with the internal resistance falling to about $\frac{1}{6}^{th}$ of the value obtained when the initial performance was measured.

TABLE 3

|  | 60° C. | |
|---|---|---|
|  | Capacitance (F) | Internal resistance (Ω) |
| Working Example 2-1 | 3.5 | 1.1 |
| Working Example 2-2 | 4.2 | 0.9 |

TABLE 3-continued

|  | 60° C. | |
|---|---|---|
|  | Capacitance (F) | Internal resistance (Ω) |
| Comparative Example 2-1 | 3.0 | 2.3 |
| Comparative Example 2-2 | 1.8 | 4.7 |
| Comparative Example 2-3 | 2.7 | 1.1 |

In addition, the secondary batteries obtained were heated in a thermostatic chamber at 60° C., and cyclic charging and discharging was carried out. The number of cycles was set to one charge-discharge cycle for determining the initial performance, and 20 cycles overall. After charge/discharge cycling, the thermostatic chamber was returned to 25° C. and left to stand for 2 hours, following which the performance was measured in the same way as for measurement of the initial performance. Percent changes in the capacitance and internal resistance were calculated relative to an arbitrary value of 100% for the initially measured capacitance and internal resistance. The results are shown in Table 4.

As shown in Table 4, when cycling was carried out at an elevated temperature in the secondary battery produced in Comparative Example 2-1, the capacitance decreased. Also, the internal resistances of the secondary batteries produced in Working Examples 2-1 and 2-2 tended to decrease or remain substantially the same when cycling was carried out at 60° C., whereas the internal resistances of the other secondary batteries tended to rise when cycling was carried out at 60° C.

TABLE 4

|  | After 20 cycles at 60° C., | |
|---|---|---|
|  | Retention of capacitance (%) | Retention of internal resistance (%) |
| Working Example 2-1 | 99 | 98 |
| Working Example 2-2 | 98 | 101 |
| Comparative Example 2-1 | 87 | 118 |
| Comparative Example 2-2 | 95 | 107 |
| Comparative Example 2-3 | 99 | 102 |

[Working Example 2-3] Lithium-Ion Battery (1) Production of Positive Electrode

A positive coating paste was prepared by adjusting a positive electrode active material (LiCoO$_2$, from Honjo Chemical Corporation), a conductive material (acetylene black, from Denka Co., Ltd.), and PVDF to a weight ratio therebetween of 91:3:6 and dissolving these ingredients to form a solution, and then mixing the solution together with NMP. The positive electrode coating paste was applied with a doctor blade onto aluminum foil to a dry film thickness of 115 µm, subsequently dried at 80° C. for 2 hours and rolled so as to form a LiCoO$_2$ positive electrode, thereby giving a positive electrode assembly.

(2) Production of Secondary Battery

A coin-type lithium secondary battery was produced by cutting both the positive electrode obtained above and a metallic lithium foil as the negative electrode to a 12-mm diameter size, sandwiching a polyolefin flat-film membrane (Hipore, from Asahi Kasei-E-materials Corporation) as the separator between the positive and negative electrodes thus cut out, and injecting and impregnating therein the liquid electrolyte obtained in Working Example 1-1.

The lithium-ion battery obtained as described above was subjected to a charge/discharge test in which the upper voltage limit on charge was set to 4.2 V, the cut-off voltage on discharge was set to 3 V, and constant-current low-voltage charging and constant-current discharging were carried out at a current density of 0.025 mA/cm$^2$.

As a result, the discharge capacity per unit weight of $LiCoO_2$ was 122.5 mAh/g, which is sufficient for a lithium-ion battery.

[Working Example 2-4] Air Battery (1) Production of Positive Electrode

A positive electrode coating paste was prepared by adjusting a positive electrode active material (MCMB, from Osaka Gas Chemicals Co., Ltd.) and PVDF to a weight ratio therebetween of 88:12 and mixing these together with a suitable amount of NMP. This positive electrode coating paste was applied with a doctor blade onto aluminum foil to a dry film thickness of 75 μm, subsequently dried at 140° C. for 72 hours to remove the NMP and moisture, and rolled so as to form a positive electrode, thereby giving a positive electrode assembly.

(2) Production of Air Battery

The positive electrode obtained above and metallic lithium foil as the negative electrode were cut to a size of 12 mm diameter for the positive electrode and a size of 15 mm diameter for the negative electrode. The liquid electrolyte obtained in Working Example 1-1 was impregnated into a polyolefin flat-film membrane (Hipore, from Asahi Kasei E-materials Corporation) as the separator, and this was sandwiched between the cut-out positive and negative electrodes, thereby producing a lithium-air battery cell. This cell was placed within a positive electrode can having air holes formed therein and disposed in such a way that the positive electrode current collector faces the air holes, following which a negative electrode can was set on top and both portions of the cell enclosure were mechanically sealed, thereby producing an air battery. The resulting cell was placed within a glass desiccator (500 mL) equipped with a gas-flushing cock. The interior of the glass desiccator had a structure that allows the introduction of oxygen, enabling oxygen to be supplied to the positive electrode.

The air battery obtained as described above was subjected to a charge/discharge test in which the upper voltage limit on charge was set to 3.8 V, the cut-off voltage on discharge was set to 2 V, and constant-current, low-voltage charging and constant-current discharging were carried out at a current density of 67 nA/cm$^2$. The resulting discharge capacity was 3.3 mAh.

As noted above, the liquid electrolyte for secondary batteries of the invention has a wide potential window and an excellent withstand voltage. Moreover, secondary batteries produced using this liquid electrolyte have an excellent performance in high-temperature environments, with the internal resistance at elevated temperature greatly decreasing and the battery incurring little deterioration even when charging and discharging are repeatedly carried out at high temperature.

The invention claimed is:

1. A secondary battery, which is an air battery, comprising:
    an air positive electrode layer being supplied with oxygen,
    a negative electrode layer, and
    a separator between the air positive electrode layer and the negative electrode layer, the separator being impregnated with a liquid electrolyte
    comprising an ionic liquid of formula (1) and an ion-conductive salt

[Chemical Formula 1]

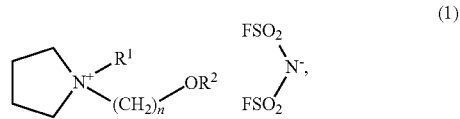

and
    wherein $R^1$ and $R^2$ are each independently an alkyl group of 1 to 5 carbon atoms, and n is 2,
    wherein the liquid electrolyte is free of organic solvent, and
    wherein a concentration of the ion-conductive salt in the liquid electrolyte is from about 0.8 to about 2 mol/L.

2. The secondary battery according to claim 1, wherein $R^1$ and $R^2$ are each independently a methyl group or an ethyl group.

3. The secondary battery according to claim 1, wherein $R^1$ and $R^2$ are both methyl groups.

4. The secondary battery according to claim 1, wherein the liquid electrolyte consists solely of the ionic liquid of formula (1) and the ion-conductive salt.

5. The secondary battery according to claim 1, wherein the ion-conductive salt is a lithium salt.

6. The secondary battery according to claim 4, wherein the ion-conductive salt is a lithium salt.

7. The secondary battery according to claim 5, wherein the lithium salt is one or more selected from the group consisting of lithium tetrafluoroborate, lithium hexafluorophosphate, lithium bis(trifluoromethanesulfonyl)amide and lithium bis(fluorosulfonyl)amide.

* * * * *